United States Patent [19]

Marquis

[11] 4,046,764
[45] Sept. 6, 1977

[54] METHOD AND APPARATUS FOR MEASURING THE THERMAL NEUTRON ABSORPTION RATE IN EARTH FORMATIONS

[75] Inventor: Gerald L. Marquis, Houston, Tex.

[73] Assignee: Dresser Industries, Inc., Dallas, Tex.

[21] Appl. No.: 564,233

[22] Filed: Apr. 2, 1975

[51] Int. Cl.$^2$ .............................................. G01V 5/00
[52] U.S. Cl. ..................................... 250/262; 250/270
[58] Field of Search ................................ 250/262, 270

[56] References Cited

U.S. PATENT DOCUMENTS

| 3,133,195 | 5/1964 | Jones et al. | 250/262 |
| 3,435,216 | 3/1969 | Givens | 250/262 |
| 3,609,366 | 9/1971 | Schwartz | 250/262 |

Primary Examiner—Harold A. Dixon

Attorney, Agent, or Firm—William E. Johnson, Jr.

[57] ABSTRACT

Circuitry is provided for establishing the points in time at which radiation is detected following each neutron burst in pulsed neutron logging. Means are provided to generate a signal indicative of the arithmetic mean to then compute the macroscopic thermal neutron capture cross section of the formation of interest surrounding the borehole. In one embodiment, an indeterminate number of gates provides a means of establishing the point in time of each pulse indicative of detected radiation. In another embodiment, only a predetermined number of such gates are used. In yet another embodiment, a weighting factor is applied to pulses occurring either before or after the arithmetic mean such that the number of pulses before the arithmetic mean are a multiple of the number occurring after such time.

5 Claims, 24 Drawing Figures

METHOD AND APPARATUS FOR MEASURING THE THERMAL NEUTRON ABSORPTION RATE IN EARTH FORMATIONS

BACKGROUND OF THE INVENTION

This invention relates, in general, to radioactivity well logging, and specifically, to methods and apparatus for determining the macroscopic thermal neutron capture cross section of the formations surrounding a borehole as determined by radiation measurements.

PRIOR ART

It is well known in the art of radioactivity well logging, for example, as illustrated and described in U.S. Pat. Nos. 3,379,882 and 3,379,884 which issued to Arthur H. Youmans on Apr. 23, 1968, each of which is assigned to the assignee of the present invention, to measure the macroscopic thermal neutron capture cross section [sigma ($\Sigma$)] of the formations surrounding an earth borehole. It is also well known in the prior art to make such a measurement or computation by measuring the decline of the thermal neutron population in such formations within a fixed period of time following the emission of a burst of high energy neutrons and by dividing the radiation indicative of such thermal neutrons into two time groups and computing the rate of change over the selected time interval. By breaking the data into two time groups, those skilled in the art will recognize that each of the data groups varies statistically. Sigma ($\Sigma$) as computed from the two groups varies to a greater degree than either one of the data units.

In one embodiment of the system according to the present invention, however, all of the data within the selected period of time is used to calculate a single point. This single point and the known absorption mode is sufficient data to compute sigma ($\Sigma$). Since all data are used to calculate a single value, the computed values are statistically more accurate than values obtainable by the prior art.

Furthermore, it should be appreciated that the method and apparatus according to the present invention considers the exact place and time of each pulse.

It is therefore the primary object of the present invention to provide new and improved methods and apparatus for determining a macroscopic thermal neutron capture cross section of formations surrounding earth boreholes;

It is also an object of the present invention to provide new and improved methods and apparatus for determining the exact place and time of pulses indicative of detected radiation following bursts of fast neutrons in proximity to earth formations surrounding boreholes;

It is also an object of the present invention to provide new and improved method and apparatus for measuring the macroscopic thermal neutron capture cross section of a medium using data from a single detection interval following irradiation of the medium with neutrons;

It is yet another object of the invention to provide new and improved methods and apparatus for determining the place in time of each of one or more pulses indicative of detected radiation following a portion of a burst of fast neutrons in a medium; and It is yet another object of the present invention to provide new and improved methods and apparatus for determining the arithmetic mean time of a plurality of pulses indicative of detected radiation following a portion of a burst of fast neutrons in or near a medium.

The objects of the invention are accomplished, generally, by methods and apparatus which determine the time relationship of at least one pulse indicative of detected radiation subsequent to a portion of a burst of neutrons from a neutron source in or near the medium being investigated.

These and other objects, features and advantages of the present invention will be more apparent from a reading of the following detailed specification and drawing, in which:

Before referring to the drawing in more detail, the following theory relative to the present invention should be considered. In all homogenous mediums, the rate of thermal neutron absorption is defined by the following equation:

$$N_2 = N_1 e^{-\Delta t/\tau} \quad (1)$$

$N_1, N_2$ — Number of thermal neutrons in existence at times $t_1, t_2$
$\Delta t$ — Time between measurements ($t_1 - t_2$)
$\tau$ — Absorption rate of thermal neutrons in the medium.

Thermal neutron capture cross section of the medium is determined from the rate of absorption as follows:

$$\Sigma = \frac{1}{V\tau} \quad (2)$$

$\Sigma$ — Thermal neutron capture cross section
$V$ — Velocity of thermal neutrons
Solving for Sigma yields the familiar equation:

$$\Sigma = \frac{1}{V\Delta t} \ln \frac{N_1}{N_2} \quad (3)$$

Figure 7:
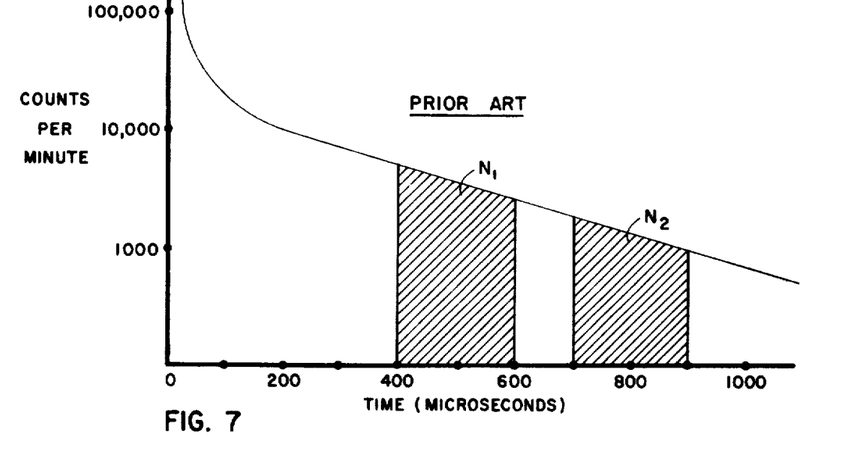
FIG. 7 is a schematic illustration of a typical curve showing the decline of the thermal neutron population in a medium and the prior art method of using two gates.

If it is assumed that data from 400 –900 microseconds following the neutron burst in a pulsed neutron cycle is representative of the formation, $N_1$ can be measured from time 400 –600 and $N_2$ from 700 –900, for example, as shown in FIG. 7 herein. $\Delta t$ as measured between the midpoints of the two "windows" is thus 300 microseconds. V is set to a constant value of 2200 meters/second. This is sufficient data to calculate Sigma.

Since both $N_1$ and $N_2$ vary statistically, the higher the value of N, the lower the fractional variation. The variation of the ratio $N_1/N_2$ is therefore greater than either of the individual variations.

There is a value of time (t) between 400 and 900 such that 50% of the pulses fall between 400 and $t$, and 50% fall between $t$ and 900. Sigma can be computed from this value of t and the known absorption mode.

Since the pulse rate falls exponentially with time, the value of $t$ is the simple arithmetic mean of the time beyond 400 microseconds for all pulses that fall in the 400 - 900 gate.

$$t = \frac{t_1 + t_2 + t_3 + \cdots + t_n}{n} \quad (4)$$

In a continuous measuring process, $n$ is a statistically varying pulse rate. However, no statistical variation is introduced in equation (4) by dividing by $n$, where $n$ is the number of T's in the numerator and $t$ is the desired arithmetic mean.

Although the absorption rate is an exponential function, individual pulses are random occurring and a statistical variation is imposed on $t$, the variation being a function of the magnitude of $n$. For an identical instrument, $n$ is greater than the sum $N_1 + N_2$ (by the pulses occurring between the time 600 - 700 microseconds). Consequently, t is statistically more accurate than the ratio $N_1/N_2$. However, the full statistical improvement of $t$ over the ratio $N_1/N_2$ is not realized in the final computed value of Sigma. As can be seen in equation (3), the value of $\Delta t$ is a modifier of the statistical variation of the ratio $N_1/N_2$. In one respect $t$ is analogous to $\Delta t$. In the example system used, $t$ will always be less than $\Delta t$.

The following is a comparison of statistical accuracy that can be expected from the two systems:

Probable error with a 95% confidence level of a statistical recording is calculated as follows:

$$\% \text{ error } (\pm) = \frac{196}{\sqrt{2nt}}$$

$n$ is counts per second and $t$ is the time constant. By changing $n$ to counts per minute and setting $t = 3.0$, this becomes:

$$\% \text{ error } (\pm) = \frac{620}{\sqrt{CPM}}$$

A formation with $\Sigma = 30.3$ ($\tau = 150$) is the assumed model for study. A counting rate of 6000 cpm at the time 400 microseconds that decreases exponentially to 214 cpm at 900 microseconds is assumed.

For gates set at 400 –600 and 700 –900 the following values are calculated:

$$N_1 = 4418 \pm 9.33\%$$

$$N_2 = 596 \pm 25.4\%$$

$$\frac{N_1}{N_2} = \frac{4418}{596} \pm \sqrt{9.33^2 + 25.4^2}$$

$$\frac{N_1}{N_2} = 7.4 \pm 27\%$$

$$\Sigma = \frac{10.5}{\Delta T} \log \frac{N_1}{N_2}$$

$\Delta T = 300$ microseconds

The Sigma value of 30.3 varies statistically within the range 25.6 to 34.0, 95% of the time.

$$\Sigma \approx 30.3 \pm 14\%$$

For a calculation of $t$, the counting rate from 400 - 900 is used.

$$N = 5786 \pm 8.16\%$$

$$t = 100 \pm 8.16\%$$

However, from charted figures, it can be found that Sigma varies between 27.3 and 33.3.

$$\Sigma \approx 30.3 \pm 10\%$$

The effect of cutting the source output by half would be to cut the count rates in half and increase the statistical variation by a factor of 41%. Calculation would yield $t = 100 \pm 11.5\%$. Sigma would vary between 26 and 34, approximately the same variation found when Sigma was computed from the $N_1/N_2$ ratio in the previous model. It is thus concluded that the t method of calculation over the method used in the prior art is comparable to doubling the output of the accelerator source.

The relation between $t$ and $\tau$ is determined as follows:

$$N_{400}(1 - e^{-t/\tau}) = N_{400}(e^{-t/\tau} - e^{\frac{-500}{\tau}}) \quad (5)$$

$$1 - 2e^{-t/\tau} + e^{\frac{-500}{\tau}} = 0$$

$$t = \tau \ln \left[ \frac{2}{1 + e^{\frac{-500}{\tau}}} \right]$$

$N_{400}$ is the pulse rate at the time 400 microseconds after the neutron source burst; 500 microseconds is the total gate width. Capture cross section is a function of $\tau$ as contained in equation (2). Combining equations (2) and (5) results in:

$$t = \frac{1}{\Sigma V} \ln \frac{2}{1 + e^{-500\Sigma V}} \quad (6)$$

As can be seen, a unique solution is obtained and each measured value of $t$ defines a single value of capture cross section. There is less statistical variation in capture cross section computed in this manner than in the presently used prior art systems. It has been determined that $$\Sigma \simeq \frac{K_0}{Vt} - K_1 t$$

where $K_O = 3.535714285 \times 10^3$ and
$K_1 = 5.357142857 \times 10^{-2}$

Figure 1:
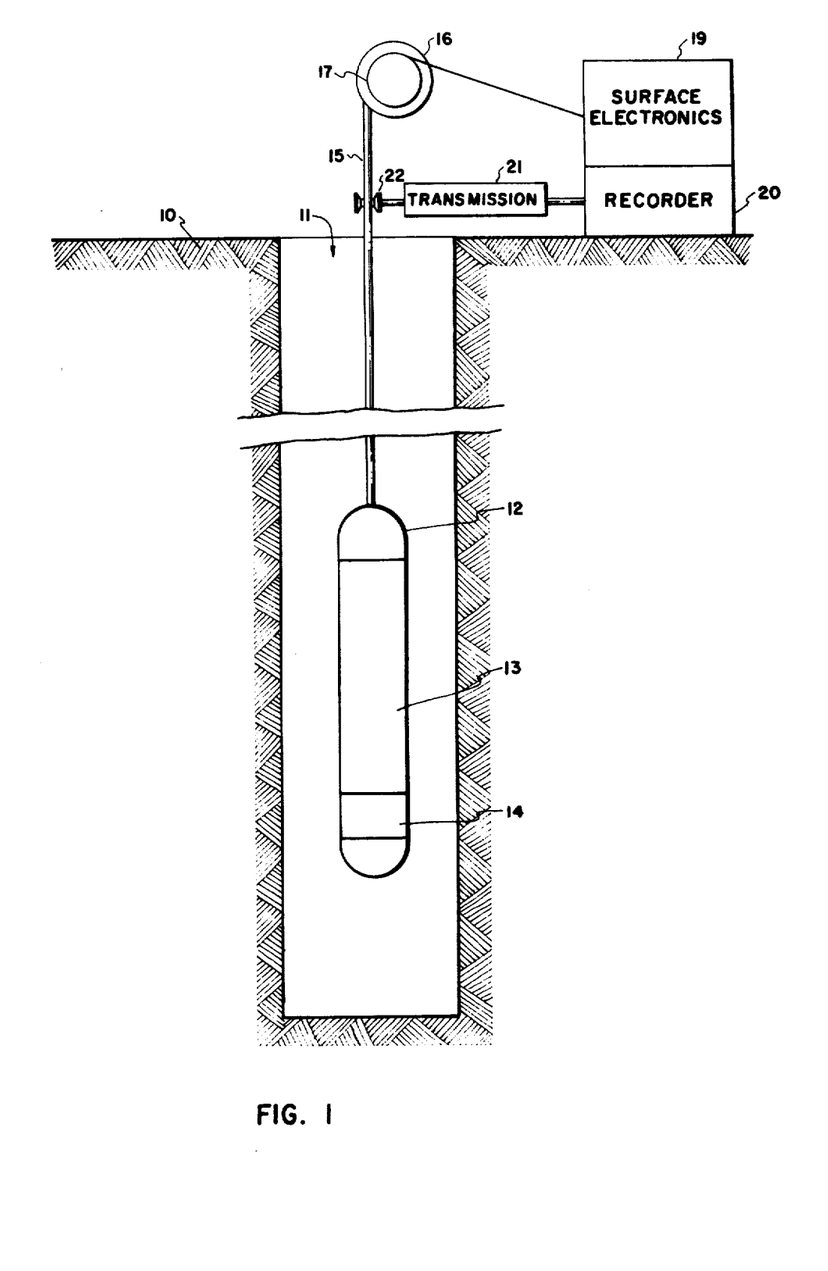
FIG. 1 is a side elevational view, partly in cross section, of a radioactivity logging system in accordance with the present invention.

Referring now to the drawing in more detail, especially to FIG. 1, there is illustrated schematically a radioactivity well surveying operation in which a portion of the earth's surface 10 is shown in vertical section. An earth borehole 11 penetrates the earth's surface and may or may not be cased. Disposed within the well is subsurface instrument 12 of the well logging system. Subsurface instrument 12 comprises a detecting system 13 and a pulsed neutron source 14 for irradiating the formations with high energy neutrons. Cable 15 suspends the instrument 12 in the well and contains the required conductors for electrically connecting the instrument with the surface apparatus. The cable is wound on or unwound from drum 16 in raising and lowering the instrument 12 to traverse the well.

In making a radioactivity log of a well, instrument 12 is caused to traverse the well. Thereby high energy neutrons from source 14 pulsedly irradiate the formations surrounding the borehole, and radiations influenced by the formations are detected by the detecting system 13. The resultant signal is sent to the surface through cable 15. Through the slip rings and brushes 17 on the end of the drum, the signals are coupled into the surface electronics 19. After processing by the circuitry as hereinafter described and illustrated, the resulting information is recorded on the recorder 20. Recorder 20 is driven through a transmission 21 by a measuring reel 22 over which cable 15 is drawn so that recorder 20 moves in correlation with depth as instrument 12 traverses the well. The elements are shown diagrammatically, and it is to be understood that the associated circuits and power supplies are provided in a conventional manner. It is also to be understood that the housing for the instrument 12 is constructed to withstand the pressures and mechanical and thermal abuses encountered in logging a deep well and to provide adequate space within it to house the necessary apparatus and to permit the transmission of radiation through it. Furthermore, it should be appreciated that pulse neutron generators are well known in the art, for example, the static atmosphere D-T ion accelerator of the type depicted in U.S. Pat. No. 2,689,918 which issued Sept. 21, 1954 to Arthur H. Youmans. Likewise, the radiation detector systems employed with pulsed neutron logging are also well known in the art, for example, U.S. Pat. No. 3,358,142 which issued on Dec. 12, 1967 to Eric C. Hopkinson et al.

In the operation of the apparatus of FIG. 1, the source 14 is periodically activated, for example, once every thousand microseconds and gamma rays are detected by the detector system 13 which are indicative of thermal neutrons captured subsequent to the termination of each neutron source burst and electrical signals are sent up the cable 15 indicative of such detected gamma radiation in a manner well known in the art, for example, as illustrated and described in U.S. Pat. Nos. 3,379,882 and 3,379,884, each of which issued on Apr. 23, 1968 to Arthur H. Youmans.

Figure 2:
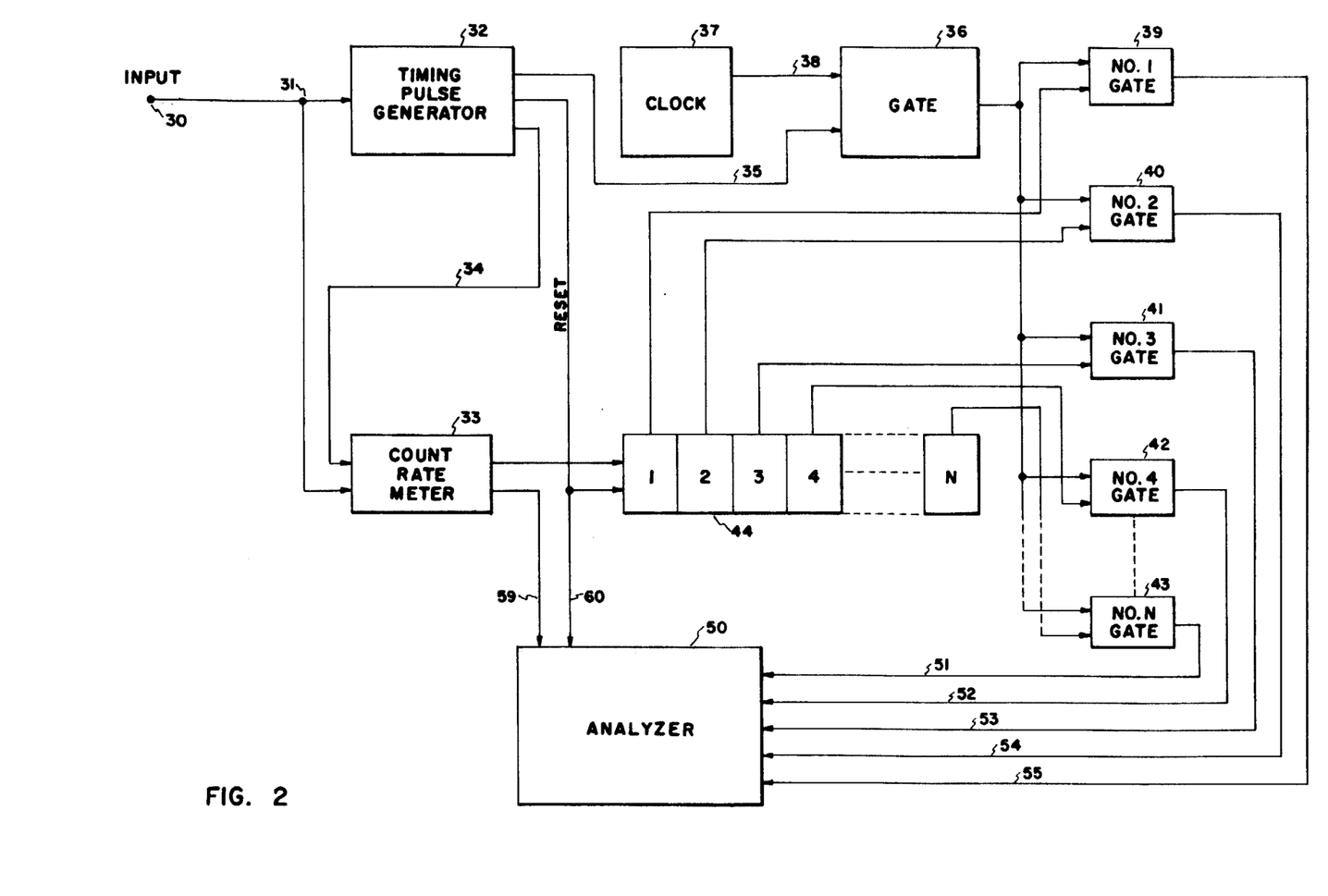
FIG. 2 is a block diagram of circuitry used in accordance with the present invention.

Referring now to FIG. 2, circuitry is described in block diagram in accordance with the present invention wherein the input terminal 30 is connected to a junction 31 which in turn is connected into the input of a timing pulse generator 32. The junction 31 is also connected to one input of a count rate meter 33. The timing pulse generator has one of its outputs connected to an additional input to the count rate meter 33 by means of a conductor 34. Another output of the timing pulse generator 32 is connected by conductor 35 to one input of gate 36. Another input to the gate 36 is driven by the output of clock 37 by means of conductor 38. The output of gate 36 is connected to a first input of each of the plurality of gates 39-43, also identified as being gates No. 1, No. 2, No. 3, No. 4, and No. N, respectively.

The output of the count rate meter 33 is connected into the conventional pulse detector circuit 44, for example, a pulse register having a plurality of outputs which are respectively connected to the second inputs of gates 39-43. The pulse detector circuit 44 recognizes the time sequence of the output pulses from the count rate meter 33 and sorts them accordingly. Thus, the first pulse in the detection cycle is passed to the No. 1 gate and the second pulse received is passed in a similar manner to the No. 2 gate. By having an adequate number of places within pulse detector circuit 44 and a correspondingly adequate number of gates, a timing gate is thus turned on by each pulse detected in the count rate meter 33 at a time coinciding with the time position of that pulse in the detection cycle. Following the end of the cycle, a reset pulse from the timing pulse generator 32 returns the pulse detector circuit 44 to its original condition.

Figure 3:
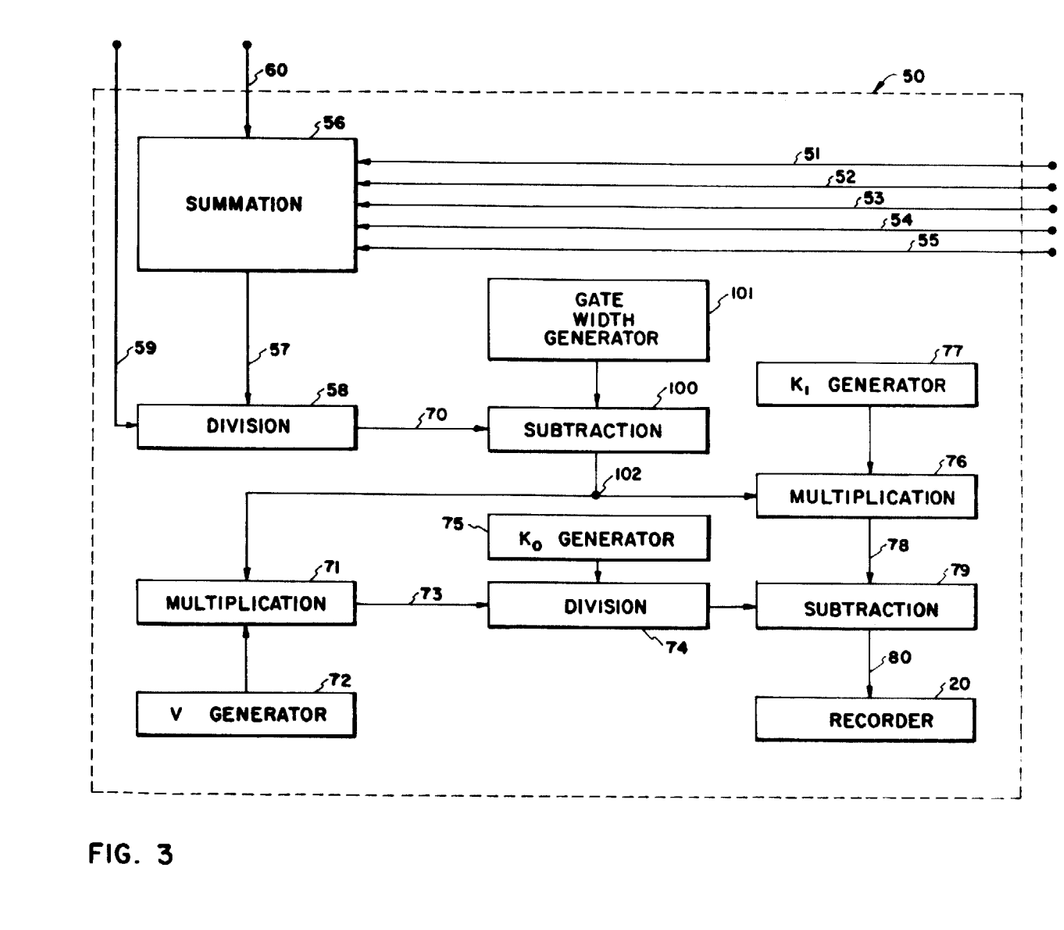
FIG. 3 is a block diagram showing in more detail the analyzer circuit of FIG. 2 in accordance with the present invention.

Output pulses from count rate meter 33 and also reset pulses from the timing pulse generator 32 are also connected into the analyzer circuit 50 which is described in greater detail in FIG. 3. The outputs of gates 39-43 are also connected into the analyzer circuit 50.

Figure 9:
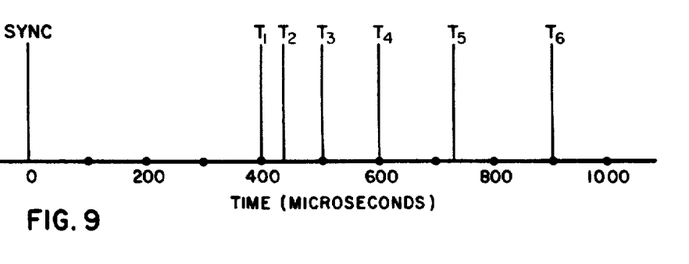
FIG. 9 schematically illustrates the exemplary occurrence of six pulses indicative of detected radiation during the single gate shown in FIG. 8.

In the operation of the circuit of FIG. 2, it should be appreciated that the input signal appearing at input terminal 30 consists of a trigger or sync pulse followed by the signal pulses of interest, for example, as illustrated in FIG. 9 wherein six signal pulses are illustrated ($T_1 - T_6$) following the sync pulse at time zero. The trigger pulse is synchronized with the neutron burst from the subsurface instrument source. The signal pulses are random but on the average decrease in number exponentially with time. A relatively few follow each neutron burst varying from zero to probably less than 10. This number is a function of instrument efficiency and well bore environment. Although the circuitry illustrated utilizes gates No. 1, 2, 3, 4 through $n$, any number of gates can be used to accept the required number of pulses per cycle.

The timing pulse generator 32 accepts the trigger sync pulse and generates time oriented logic signals for the other circuit blocks. For example, if the desired signal pulses fall in the time period of 400-900 microseconds following the trigger sync pulse, the following logic is generated:

A. a 400-900 microsecond "gate on" signal coupled into the count rate meter by means of conductor 34 from the timing pulse generator 32.

B. A 400-900 microsecond gate on signal which is coupled into the gate 36 by means of conductor 35 to thereby couple out the clock pulses from clock 37 to the inputs of gates 39-43.

C. A reset pulse is coupled out of the timing pulse generator 31 into the inputs of the pulse detector circuit 44 and the analyzer circuitry 50 by conductor 60 as described in greater detail in FIG. 3.

The preferred embodiment contemplates the use of a 5 MHz clock 37 which is used as the digital time reference for the measurement of $t$. The basic frequency of the clock is not critical; the value selected is determined by the desired accuracy in the measurement of $t$. With a 5 MHz clock, t can be measured within 0.2 microseconds. The gate on pulse from the timing pulse generator 32 into the gate 36 thus enables the clock pulses to be used to operate gates 39-43. By way of further example, the clock gate 36 is open for the period 400-900 microseconds and the 5 MHz clock pulses are applied to the timing gate circuits during this period. The gates 39-43 are in the off condition at all other times.

The count rate meter circuit 33 is in the off condition except when turned on by logic from the timing pulse generator 32, in this example, 400-900 microseconds following the trigger sync pulse. When turned on, the count rate meter circuit 33 accepts signal pulses from the input terminal 30. The pulses detected are processed in two fashions. They are shaped and integrated with an appropriate time constant to produce an analog signal proportional to the pulse rate. In addition, each signal pulse is shaped and passed as a gating pulse to the pulse detector circuit 44.

The timing gates 39-43 are in the off position until the information cycle begins at 400 microseconds and the clock pulses are impressed on the inputs of the gates 39-43. When the first signal pulse occurs and is detected by the pulse detector circuit 44, the No. 1 gate 39 is turned on and remains on throughout the measure cycle. The output of the No. 1 gate is clock pulses equivalent to the time $500 - T_1$ where $T_1$ is the time differential between the beginning of the information cycle and the detection of the first signal pulse. A second (later) pulse will open the No. 2 gate 40 and produce a signal $500 - T_2$ and so on with the other gates 41-43. At the end of the measure cycle (900 microseconds following the sync pulse), the clock gate 36 cuts off the timing pulses to the timing gates 39-43. The outputs of the gates 39-43 are coupled into the analyzer circuit 50.

Figure 8:
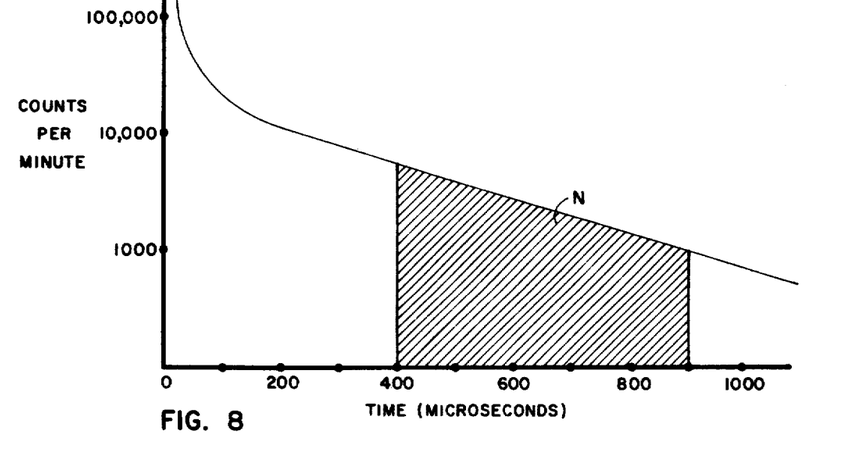
FIG. 8 schematically illustrates the decline of the thermal neutron population in a medium and the method according to the present invention using a single gate.

Looking further at FIG. 9, for example, if there are six pulses indicative of detected radiation occurring during the 400-900 microsecond window (see FIG. 8), and assuming these pulses occur at the following points:

$T_1$ = zero (time of opening the detection interval)
$T_2$ = 33 microseconds
$T_3$ = 100 microseconds
$T_4$ = 200 microseconds
$T_5$ = 333 microseconds
$T_6$ = 500 microseconds Then, using the modified form of the equation (4) because of the circuit used, $$t = 500 - \left[ \frac{(500 - T_1) + (500 - T_2) \ldots (500 - T_n)}{n} \right]$$

$$t = 500 - \left[ \frac{(500 - 0) + (500 - 33) + (500 - 100) + (500 - 200) + (500 - 333) + (500 - 500)}{6} \right]$$

$$t = 500 - \frac{1834}{6}$$

-continued $t = 500 - 305.67$ $t = 194.33$ microseconds (following the beginning of the detection interval commencing at 400 microseconds after the sync pulse).

Figure 10A:
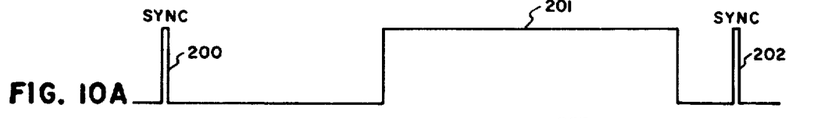
FIGS. 10A-K represent representative timing diagrams for the circuitry in accordance with FIGS. 2-9.
Figure 10B:
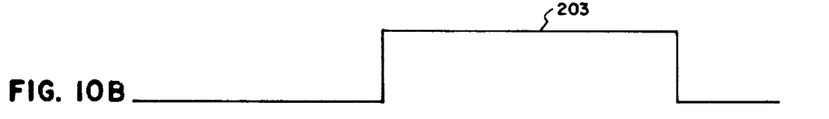
Figure 10C:
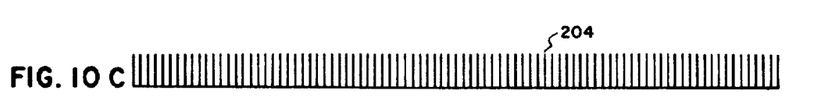
Figure 10D:
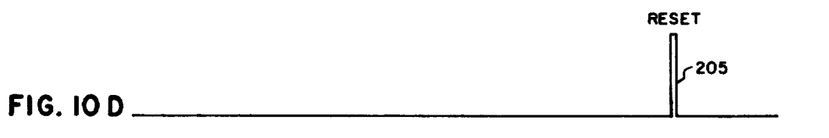

In FIGS. 10A-K, there is illustrated representative gating signals and waveforms representative of signals which might be found in the circuitry in accordance with the present invention, for example, as might be found in the circuitry of FIG. 2. Using the same example which is used with respect to FIG. 9, and assuming that there are six pulses indicative of detected radiation occurring during the 400-900 microsecond window, FIG. 10A indicates a sync pulse 200 followed by the gating pulse 201 which comes from the timing pulse generator 32. The duration of the gating pulse 201 is 500 microseconds which is followed 100 microseconds later by an additional sync pulse 202. Thus, in the system as illustrated, the sync pulses occur every 1000 microseconds. FIG. 10B illustrates the gating pulse 203 which is also coupled out of the timing pulse generator 32 into the count rate meter 33 by means of conductor 34. FIG. 10C illustrates a group of clock pulses 204 which are coupled out of the output of the clock 37 into the gate 36. FIG. 10D illustrates a reset pulse 205 which is coupled out of the timing pulse generator 32 into the register 44 and the analyzer 50.

Figure 10E:
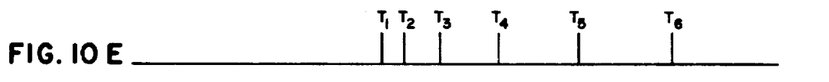
Figure 10F:
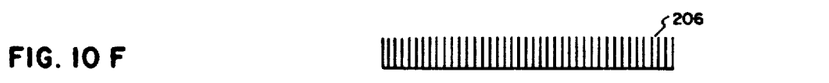
Figure 10G:
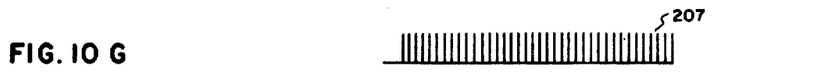
Figure 10H:
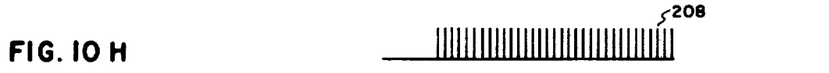
Figure 10I:
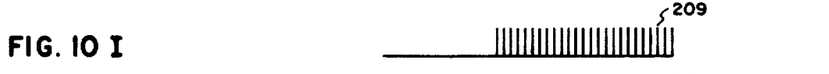
Figure 10J:
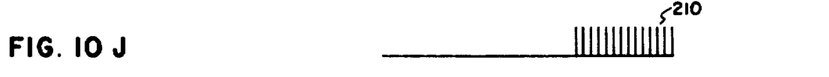
Figure 10K:
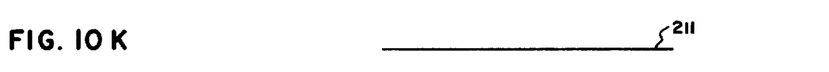

As illustrated in FIG. 10E, the illustration assumes that there are six pulses indicative of detected radiation occurring during the 400-900 microsecond window and these are represented as being pulses $T_1-T_6$. These occur at the same times as those times used with respect to the illustration of FIG. 9. As can be seen in FIGS. 10F-K, the electrical pulses $T_1-T_6$ cause the gates No. 1-N to be open to allow the clock pulses 206-211 to pass therethrough and to be coupled into the analyzer 50. It should be appreciated that since $T_1$ occurs at the beginning of the window, the clock pulses 206 are coupled through the gate 1 for the full 500 microseconds. Likewise, since $T_6$ occurs at the conclusion of the window, no clock pulses are gated through the sixth gate as illustrated by the straight line 211.

Figure 11A:
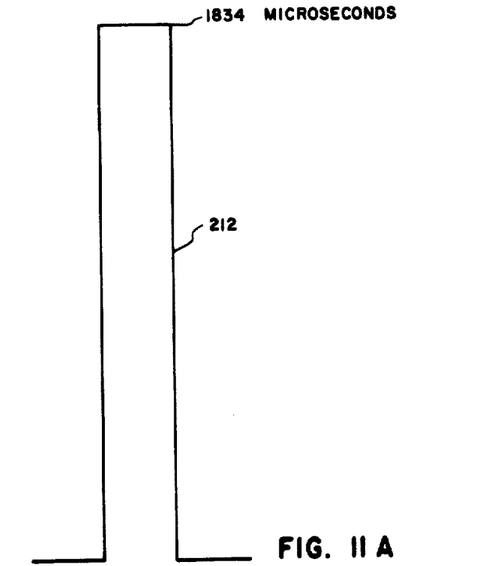
FIGS. 11A-D illustrate representative analog waveforms for certain points in the circuitry in accordance with FIG. 5.
Figure 11B:
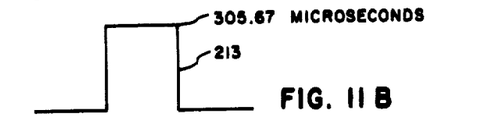
Figure 11C:
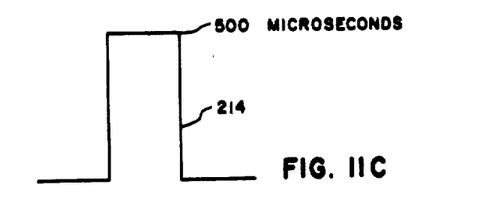
Figure 11D:
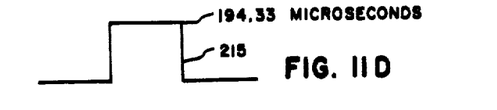

FIGS. 11A-D are representative of the analog output of the summation device 56 and some of the other circuits as illustrated in FIG. 3. In FIG. 11A, the output of the summation device is an analog signal 212 having a value corresponding to the summed digital signal of 1834 microseconds. FIG. 11B represents the output of the division circuitry 58 which is an analog signal 213 representative of the division of the signal 212 by a factor of 6 resulting in a signal correponding to 305.67 microseconds. FIG. 11C is an analog signal 214 being representative of a 500 microsecond signal produced by the gate width generator 101. FIG. 11D is an analog signal 215 having a value of 194.33 microseconds which is the output of the subtraction circuit 100 which subtracted the signal 213 from the signal 214. The signal 215 appears at the junction 102 and is representative of $t$ which was computed above with respect to FIG. 9. This $t$ value is then used in the remainder of the circuitry of FIG. 3 with similar such circuitry as above described to make the further computations.

Figure 6:
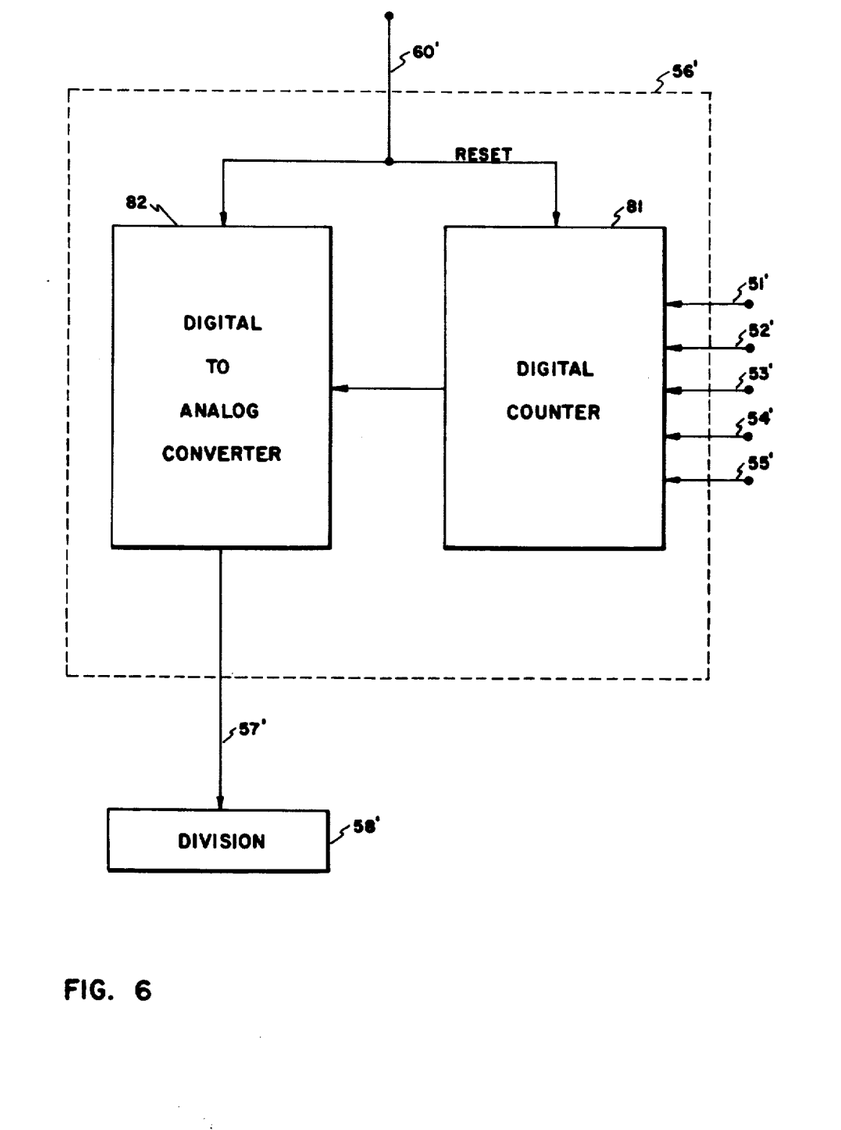
FIG. 6 illustrates in block diagram and in greater detail the summation circuitry of FIG. 5.

Referring now to FIG. 3, the analyzer circuit 50, illustrated in block diagram in FIG. 2, is shown in greater detail. The conductors 51-55 are connected to the summation circuit 56 which comprises a counter for counting the total number of clock pulses appearing on the combined conductors 51-55 during a given cycle and also a digital-to-analog circuit for converting the total digital count into an analog signal, for example, as illustrated in FIG. 6. The analog output of the summation circuit 56 is coupled by means of conductor 57 into a conventional division circuit 58 which is also connected by conductor 59 to the analog output of the count rate meter 33 illustrated in FIG. 2. The summation circuitry 56 is reset by means of the signals appearing on conductor 60 in FIG. 2 coming from the timing pulse generator 32. Thus, the output of the division circuit 58, appearing at the output 70, is indicative of the analog of the summed clock signals appearing on the conductors 51-55 divided by the number of signals from the count rate meter 33 in any given cycle. The conductor 70 is connected to the input of a conventional subtraction circuit 71 which also has an input from a gate width generator circuit 101 which generates an analog voltage equivalent to the gate width of interest, for example, 500 microseconds. The output appearing on terminal 102 from the subtraction circuit is thus equal to $t$. The voltage at junction 102 is connected to a conventional multiplication circuit 71 which also has an input from a V generator circuit which generates an analog signal indicative of the velocity of thermal neutrons, for example, 220 meters per second. Thus, the output of the multiplication circuit 71 appearing on conductor 73 is equal to $Vt$. The conductor 73 is connected into a conventional division circuit 74 which also has an input from the $K_0$ generator 75 which delivers a preset constant voltage. Thus, the output of the division circuit 74 is indicative of the fraction $$\frac{K_o}{Vt}.$$

The junction 102 is also connected into a conventional multiplication circuit 76 which also has an input from the $K_1$ generator 77. Thus, the output of the multiplication circuit 76 appearing on conductor 78 is $K_1 t$. The output of multiplication circuit 76 and the output of the division circuit 74 are each coupled into a conventional subtraction circuit 79 which produces at its output on conductor 80 an analog voltage equivalent to $$\frac{K_o}{Vt} - K_1 t.$$

As previously explained, this analog voltage is substantially equivalent to Sigma whenever $K_0$ is equal to $3.535714285 \times 10^3$ and $K_1 = 5.357142857 \times 10^{-2}$. This value of Sigma is then recorded on the recorder 20 as a function of depth in the borehole.

It should thus be appreciated that the circuit of FIG. 3 in conjunction with the apparatus and circuits of FIGS. 1 and 2 provides a means of determining the simple arithmetic mean of the time beyond 400 microseconds, for example, for all pulses that fall within the 400-900 microsecond gate.

In the preceding circuitry described and illustrated, the capture cross section was determined in a fixed period 400-900 microseconds) in a pulsed neutron cycle. However, it should be appreciated that similar methods are applicable in any fixed period. It should also be appreciated that the system is applicable where the period is varied. For example, certain prior art systems vary the measurement period as a function of the capture cross section measured. The distinguishing feature of the system so far described, however, is that is is measured directly from all data in the period of interest as opposed to comparing data from two different segments of the detection period.

Figure 4:
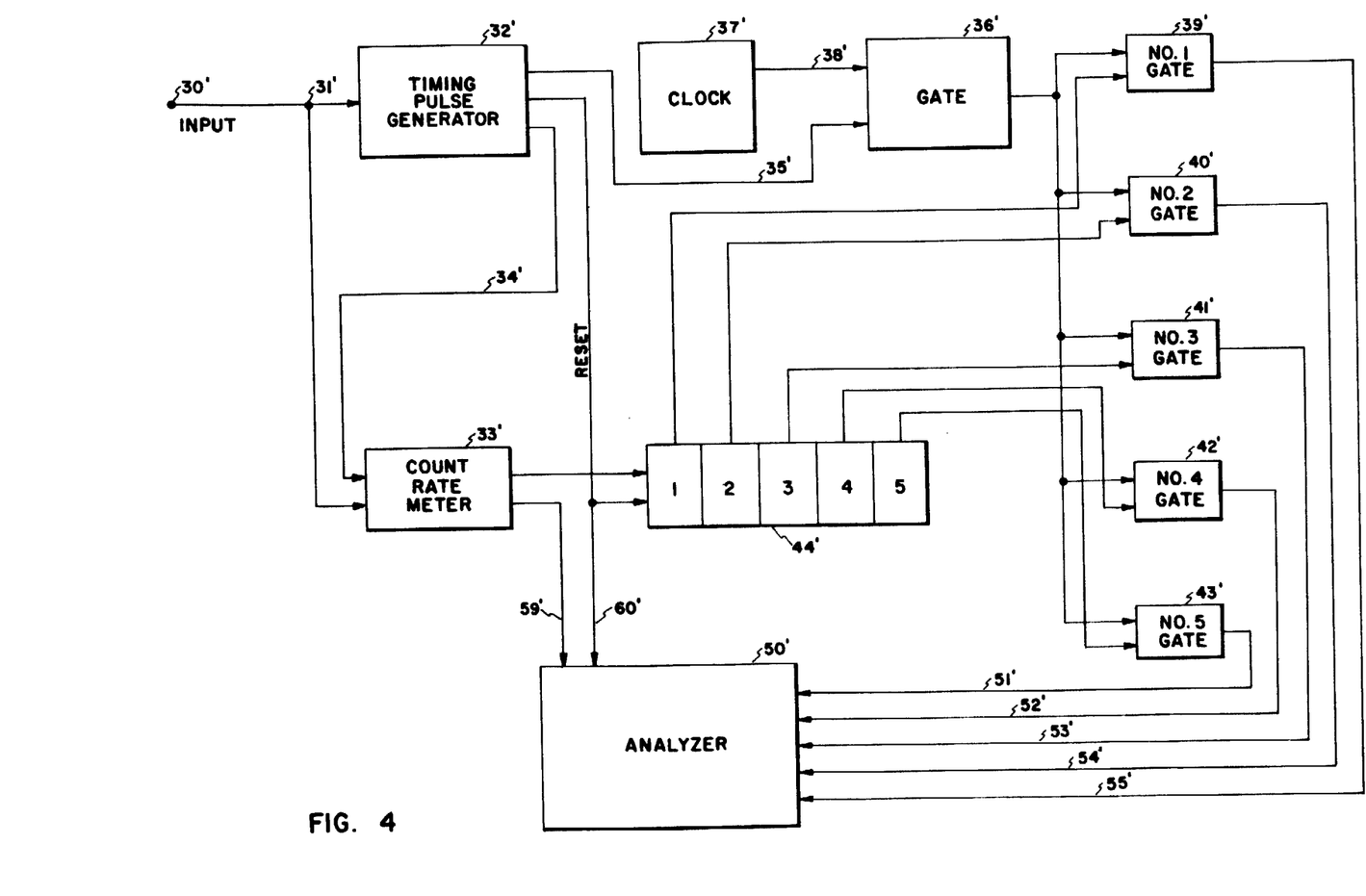
FIG. 4 illustrates in block diagram an alternative embodiment of the circuitry used in accordance with the present invention.

FIG. 4 illustrates an alternative embodiment of the present invention wherein the arithmetic mean is measured for a fixed number of pulses, for example, five. The circuitry of FIG. 4 is substantially identical with that of FIG. 2 and need not be discussed in any great detail except to recite that the generation of the last pulse in the sequence, in this example the fifth pulse, causes the analysis circuitry to be activated regardless of the number of pulses following the fifth pulse.

Figure 5:
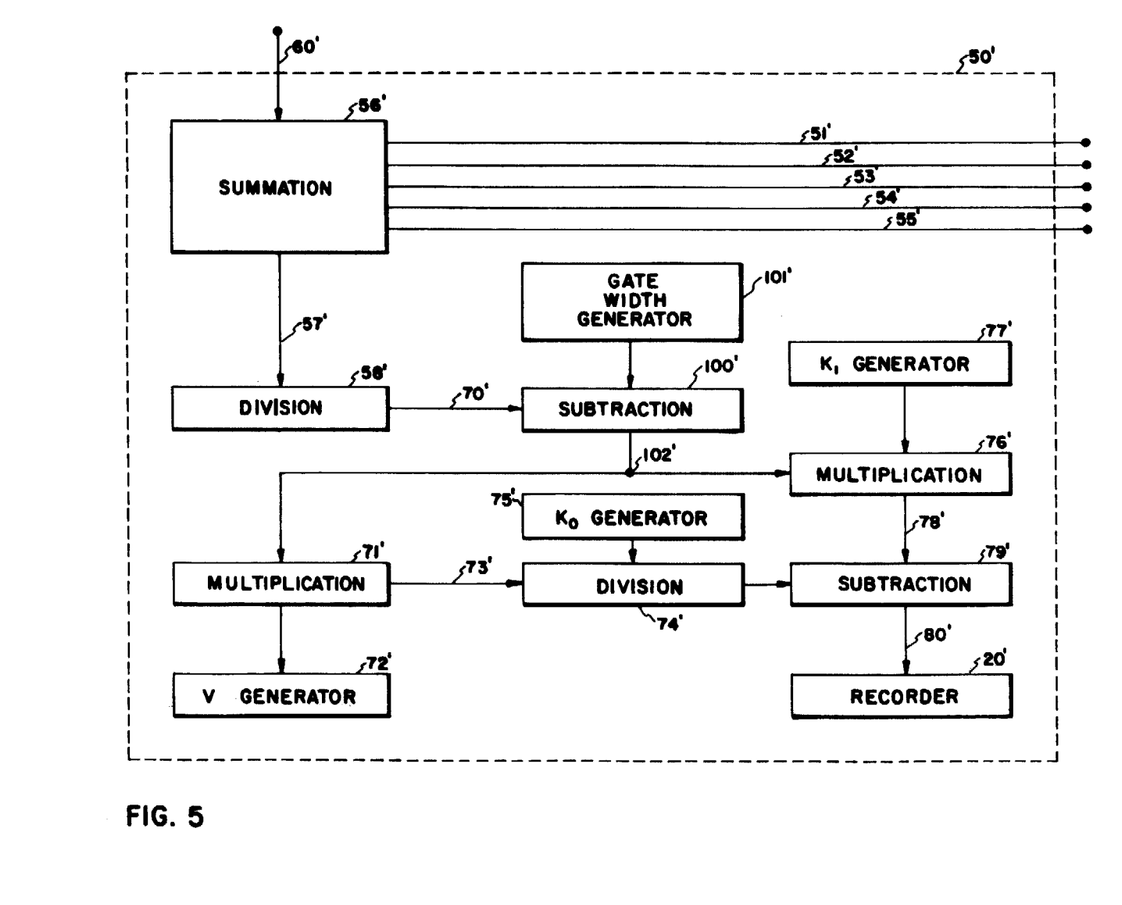
FIG. 5 illustrates in block diagram and in greater detail the analyzer circuit illustrated in FIG. 4 in accordance with the present invention.

Referring now to FIG. 5, the analyzer 50' illustrated in FIG. 4 is shown in greater detail. The circuitry is substantially similar to that of FIG. 3 except the division accomplished by the division circuit 58' is always a fixed number depending upon how many gates are used in FIG. 4. Thus, when using five gates, the division circuitry 58' will always divide the analog signal coming from the summation circuitry 56' by five. Thus, by having an accumulator that both measures the time values and, which also recognizes when a set number of pulses have been detected, produces a value of $t$ directly. Although not illustrated, the gate width generator 101' can be variable to comply in time with the detection of the fifth pulse.

Referring now to FIG. 6, the summation circuit 56' is shown in greater detail. As the clock pulses are coupled into the digital counter 81 from the conductors 51'-55', the clock pulses are counted and are transferred into the digital-to-analog converter 82. The analog signal is then coupled by conductor 57' into the division circuitry 58'. It should be appreciated that the circuitry of 56' is equally applicable to the summation circuit 56 of FIG. 3. As with the other reset circuits, the reset signal appearing on conductor 60' causes both the digital counter 81 and the digital-to-analog converter circuit 82 to be reset to zero upon the generation of a reset pulse from the timing pulse generator 32'.

Although $t$ as defined herein is indicative of that time within the selected period representative of the arithmetic mean of all pulses within the period or the arithmetic mean of the finite number of pulses selected, it should also be appreciated that a weighting factor can be applied to pulses occurring either befor or after time $t$ such that the number of pulses before $t$ are a multiple of the number occurring after $t$. A general form of this equation is obtained by assigning a weighting factor (b) to the pulses occurring after time $t$ in the selected period of "G" microseconds width:

$$t = \tau \ln \frac{1 + B}{1 + B} e^{G/\tau}$$

Although $t$ is the arithmetic mean only when $B = 1$, it still provides a unique solution to Sigma through $\tau$. As previously described, $t$ is calculated directly from all data within the selected period as differentiated from a comparison of data from two different time intervals.

The calculation of capture cross section from a measurement of t differs from presently used methods in another respect. Wherein other methods weigh all pulses within a gate equally, this methods weighs each pulse exactly as to its time position within the measure cycle.

Thus there has been described and illustrated herein circuitry and apparatus for determining when detected pulses fall, timewise, within the detection interval and the establishment of signals indicative of the thermal neutron absorption rate based upon where the signals fall within the time frame. This direct system for computation of thermal neutron absorption rate reduces the statistical variation inherent in the measurement. This improvement results from a more efficient use of data available from any pulsed neutron detection system. Thus, reliability and usefulness of the recorded data in formation evaluation is increased. Furthermore, as far as the Applicant has been able to ascertain, this system is unique in considering the exact time occurrence of each pulse occurring in the selected detection interval.

It should also be appreciated that those skilled in the art can proceed directly to $\Sigma$ from $t$ based upon derived charts and thus not choose to use the circuitry illustrated in FIGS. 3 or 5. Furthermore, while the preferred embodiment contemplates a primary utility in radioactivity well logging, other uses will be obvious, for example, the testing of core samples or other materials on the earth's surface. Likewise, those skilled in the art will appreciate that, depending upon whether the count rate of the detected pulses is high enough in a given cycle, the electrical pulses indicative of the detected radiation can be averaged over a given time period, for example, three seconds, to improve the statistical analysis of the information being recorded.

The embodiments of the invention in which an exclusive property or privilege is claimed are defined as follows:

1. Apparatus for investigating the character of earth substances and the like, comprising:
   means for irradiating said substances with a burst of neutrons;
   means for detecting radiation occasioned in said irradiated substances by said burst of neutrons during a preselected time interval following said burst of neutrons and for generating electrical pulses indicative of said detected radiation;
   circuit means for determining the time relationship of each of said electrical pulses with respect to said time interval;
   circuit means for determining the arithmetic mean of said electrical pulses as determined with respect to said time interval; and
   circuit means for computing the macroscopic thermal neutron capture cross section from the said arithmetic mean based upon the following relationship:

$$\Sigma \simeq \frac{K_0}{Vt} - K_1 t$$

where
   $\Sigma$ = macroscopic thermal neutron capture cross section
   $K_0$ = a first constant
   $K_1$ = a second constant
   $V$ = speed of thermal neutrons
   $t$ = arithmetic mean of said electrical pulses.

2. A method of well logging, comprising:
   irradiating the formations surrounding a well with a burst of high energy neutrons;
   detecting radiation occurring in said well resulting from said irradiation;
   generating time-separated electrical pulses indicative of said detected radiation; and
   generating an electrical signal representative of the arithmetic mean time of the total of said electrical pulses.

3. The method according to claim 2, including in addition thereto, the step of recording said electrical signal in correlation with an indication of depth in the well.

4. A method of well logging comprising:
   pulsedly irradiating the formations surrounding a well with repetitive discrete bursts of high energy neutrons;
   detecting radiation occurring in said well resulting from each of said bursts of neutrons;
   generating a group of time-separated electrical pulses indicative of said detected radiation following each of said bursts; and
   generating a plurality of electrical signals, each of said signals being representative, respectively, of the arithmetic mean time of the total of said electrical pulses within one of said groups of said electrical pulses.

5. The method according to claim 4, including in addition thereto, the step of recording said electrical signals in correlation with indications of depth in the well.

* * * * *